May 5, 1959  R. E. DI VETTE  2,885,026
FLUID FILTER APPARATUS
Filed June 26, 1957  2 Sheets-Sheet 1

INVENTOR.
RANDOLPH E. DI VETTE
BY
Frederick C. Lange
ATTORNEY

United States Patent Office 2,885,026
Patented May 5, 1959

2,885,026

FLUID FILTER APPARATUS

Randolph E. Di Vette, Minneapolis, Minn., assignor to Minneapolis-Honeywell Regulator Company, Minneapolis, Minn., a corporation of Delaware Application June 26, 1957, Serial No. 668,225

9 Claims. (Cl. 183—7)

The present invention is concerned with a new and improved electrostatic fluid cleaning apparatus, in particular, a disposable cell providing the ionization and collecting section. The cell is made up of a plurality of sheets of material including conducting sheets of material which are oppositely charged and are separated by insulating sheets of material.

With the increase of industrial process waste, automobile exhaust, and other materials which are in the air, the need of efficient air cleaning or the filtering of the air in the ventilating systems of buildings and homes is becoming more and more apparent. One of the most efficient types of air cleaning devices is the electrostatic air filter. This filter has an ionization section and a collecting section through which air containing foreign material is directed. The collecting section has a plurality of plates alternately charged positive or negative. As the particles of dirt or foreign material pass through the ionization section they are charged either positively or negatively. The charged particles then pass along the air stream into the collecting section and are attracted to a plate of an opposite charge.

While electrostatic air cleaners of this type have been on the market for a number of years they have been of the more permanent, commercial type having metal plates in the collecting section and generally having washing apparatus so that these plates can be periodically washed. There is a need for an inexpensive disposable cell which can be used in an electrostatic air cleaner so that once the cell is filled with dirt it can be removed from the unit.

The present invention is concerned with an improved disposable cell which when inserted in a unit will make up the ionization and collecting section of the electrostatic air cleaner. The cell is relatively easy to make and inexpensive. It can be collapsed so that packaging is no problem. After the cell is used and becomes filled with dirt, it can be readily removed and disposed.

It is therefore an object of the present invention to provide an improved electrostatic air cleaner having an inexpensive disposable cell.

Another object of the present invention is to provide an improved disposable cell for an electrostatic air cleaner which when inserted in the frame of the unit makes up the ionization and collecting section thereof.

And still another object of the present invention is to provide in an electrostatic air cleaner a disposable cell made up of a plurality of electric conducting sheets which are separated by insulating sheets so that upon the expansion of the cell by pulling apart the outer attached plates thereof a honeycomb-type collecting cell is formed.

These and other objects of the present invention will become apparent upon a study of the following specification and claims of which:

Figure 1:
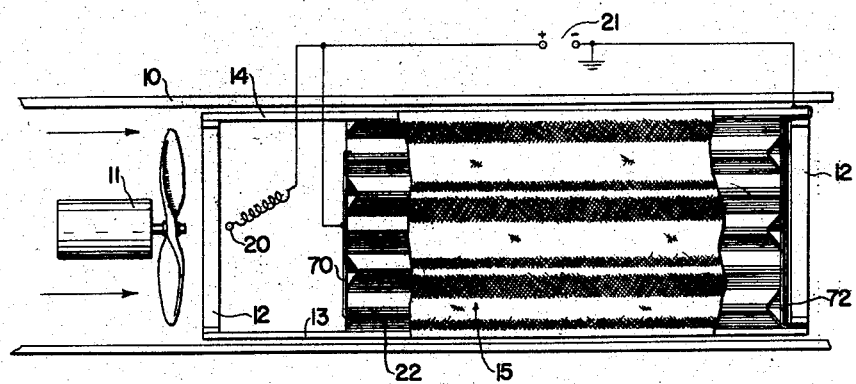
Figure 1 is a schematic view of an electrostatic fluid cleaning apparatus.

A schematic representation of my electrostatic fluid or air cleaning apparatus is shown in Figure 1 to have a casing 10 with a fan 11 mounted therein. A frame 12 which is a part of casing 10 is provided for holding the outer plates 13 and 14 of a cell 15 apart and thus expanded. The portion of plates 13 and 14 projecting to the left form the ionization section of the electrostatic filter. A wire 20 is spaced between the plates and runs perpendicular to the air flow. The plates are connected to the negative grounded terminal of a source of direct current power 21. Wire 20 is connected to the positive terminal of the source of power. Thus there exists a voltage gradient across the space between the wire and the plates 13 and 14 so that the foreign particles in the air passing therebetween are charged. The collecting section 22, as contained between plates 13 and 14 to the right of the ionization section, comprises a plurality of oppositely charged conducting plates which are separated by insulating plates. As the air containing the charged foreign particles passes through the collecting section the particles are attracted to the plate having the opposite polarity and come to rest in the cell. The clean air exhausts from the cell to the right into the ventilating system.

Figure 2:
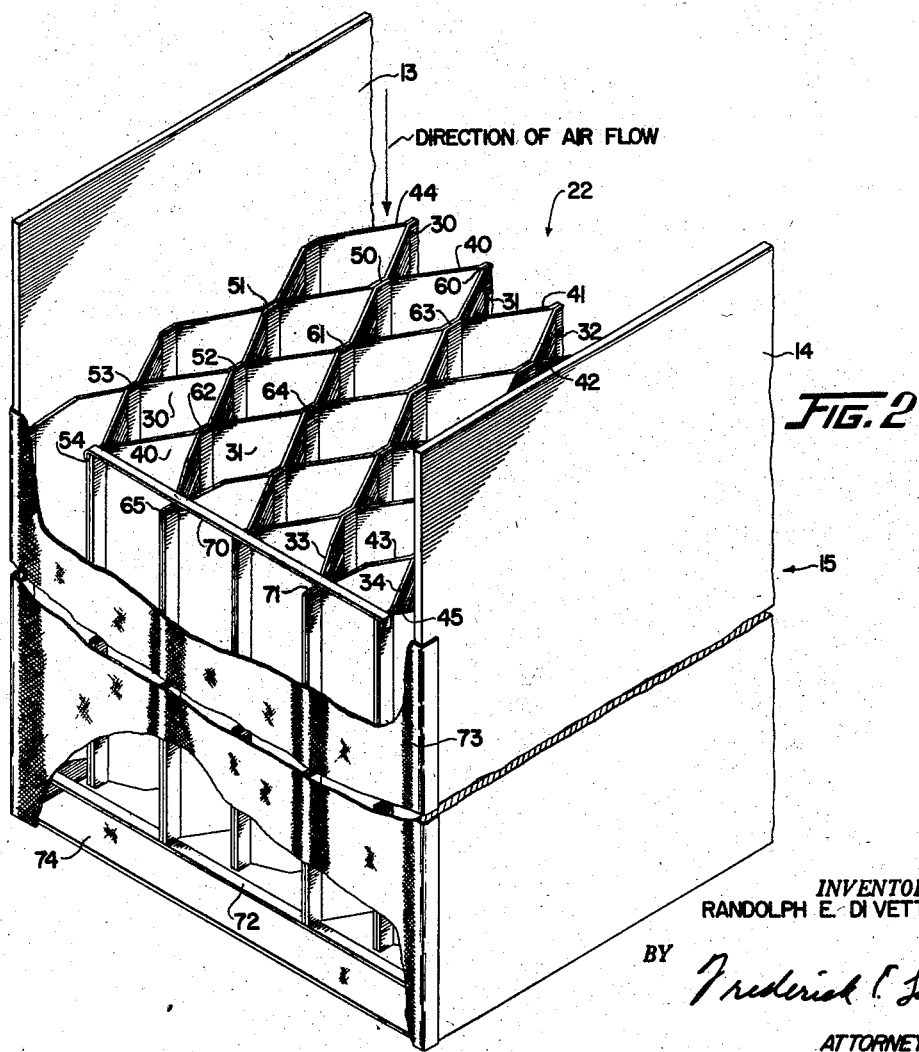
Figure 2 is a perspective view, with portions broken away of the disposable cell having the outer ground plates extended to form the ionization section when the cell is inserted into the unit as shown in Figure 1.

Referring to Figure 2, cell 15 is shown in more detail. Assembled between the lower portion of ground plates 13 and 14 is collecting section 22. Plates 13 and 14 are made up of a relatively stiff disposable material, such as cardboard, having a sufficient electrical conductive characteristic for the particular application.

For example, cardboard impregnated with a material to make it fireproof may have sufficient conductivity for the collecting portion. Since the area of plate surface in the ionization section is less generally the portions of plates 13 and 14 extending upward in Figure 2 are covered with metal foil or sprayed with a conductive material to have a lower resistance. The resistance of the plates is selected depending upon the voltage of the source and the size of unit.

The collection section comprises a first and second set of electric conducting sheets of thinner, readily foldable material, such as paper, which are so assembled to have every other sheet of the opposite potential. Referring to Figure 2, sheets 30, 31, 32, 33 and 34 are electric conducting sheets, the conductive being selected to meet the particular application. The conductivity of the sheets is increased by the application of chemicals for fireproofing, possibly during the manufacture of the paper. Metal foil or these aluminum sheets might be used depending upon the conductivity needed. Inserted between each of these sheets is an insulating sheet 40, 41, 42, and 43. Also inserted between the outer plates 13 and 14 and conducting sheets 30 and 34, respectively are insulating sheets 44 and 45. The insulating sheets are thin material such as paper having a lower electrical conductive characteristic than the material selected for sheets 30 to 34.

Adjacent sheets of the cell are attached or glued together along spaced common portions. Each common portion is a strip of the sheet running in the direction of air flow through the cell. Specifically referring to a conducting sheet 30, this is first attached along common portions 50 to insulating sheet 40, along common portions 51 to insulating sheet 44, along common portions 52 to insulating sheet 40, along common portions 53 to insulating sheet 44, and at its outer edge to insulating sheet 40 along similar common portions 54, this making up the outer edge of the cell. The common portions mentioned are parallel and spaced across the cell. Adjacent conducting sheet 31 is connected to insulating sheet 40 and insulating sheet 41 which is on the opposite side of conductor sheet 31 from insulating sheet 40. Conducting sheet 31 is connected to insulating sheet 40 along common portions 60, 61, and 62. These common portions are parallel to the previously mentioned portions but spaced in between portions 50, 52, and 54. Between the spaced portions of conducting sheet 31 common to insulating sheet 40, sheet 31 is connected at similar common portions 63, 64, and 65 to insulating sheet 41. The connection of conducting sheet 31 and insulating sheet 41 at 65 makes up the outer edge of the cell similar to 54. The outer insulating sheets 44 and 45 are connected to plates 13 and 14, respectively, between their common portion connections to the adjacent conducting sheets.

The number of sheets selected shown in Figure 2, can vary with the needed capacity for the collecting section. Other sheets would be connected in a manner as described in connection with conducting sheets 30 and 31. Upon applying a force to plates 13 and 14 to pull them apart, the cell is expanded to form a plurality of honeycomb shaped passages looking into the top of the cell in the direction of air flow. Each of these passages is bounded by a conducting sheet and an insulating sheet and adjacent conducting sheets are therefore separated by the portion of the insulating sheet.

As the insulating characteristics of a supporting insulator or insulating sheet, such as sheet 44, increases as the length of the insulator increases, it is to an advantage to have the insulators long with respect to the distance between the oppositely charged sheets or plates. By providing the insulating sheets so that they engage or are attached to adjacent conducting sheets at an angle, the so called "creep" distance across the insulator or insulating sheets is increased and the characteristics of the cell are improved.

In order to provide oppositely charged conductive sheets or plates the outer extremities of a first set of the conducting sheets are connected by means of a flexible conductor 70. Thus conducting plates 30, 32, and 34 are electrically connected. Conductor 70 does not touch the intermediate sheets as the outer portion of sheets 31 and 33 are cut near the upper end of portions 65 and 71 so that conductor 70 spans the last mentioned sheets. A second conductor 72 as the lower end of the cell connects sheets 31 and 33 to the outer plates 13 and 14 and provides the ground strap. Conductor 72 similarly spans the ungrounded sheets.

The cell has opposite sides 73 (one not shown) made up of cheese-cloth or a similar material so that the air is directed into the top of the cell through the passages confined between plates 13 and 14 and sides 73. Portions 54 of the sheets are recessed behind portions 65 so that the cheese-cloth can rest only on the ground sheets and will not short out the sheets connected to conductor 70. A mechanical filter 74 is attached to the bottom of the cell as shown in Figure 2. This filter might be a piece of cheese-cloth and is used to catch any so called "droppings" which is collected dirt pulling loose from the plates.

Figure 3:
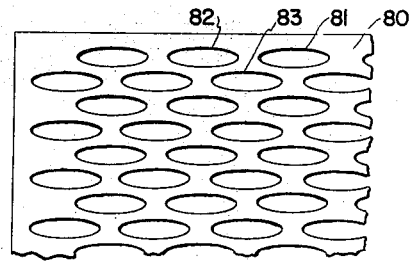
Figure 3 is a plan view of a portion of another type of insulating sheet for use in the cell of Figure 2.
Figure 4:
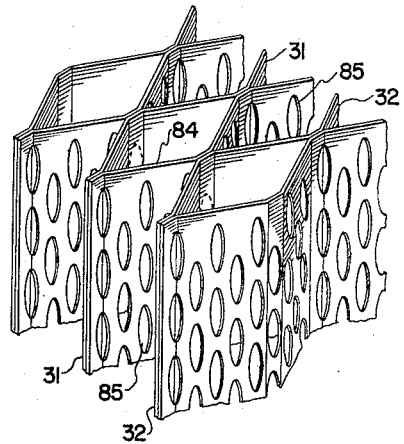
Figure 4 is a view of a portion of a cell such as Figure 2 but employing the insulating sheet of Figure 3.

As previously mentioned the length of the insulator between adjacent conductive sheets is quite important. During operation some dirt will collect on the insulator to decrease its resistance. This would result in the breakdown of this cell. To increase the resistance of these insulating sheets, they might be made as shown in Figure 3. Sheet 80 has a plurality of elongated holes 81, 82, and 83 therein. The holes are so staggered that the electrical path from the top to the bottom of the sheet 80 is increased. When insulating sheet material of the sort shown in Figure 3 is used in the cell, as shown in Figure 4, the electrical creep distance between conductive sheets 31 and 32 is increased as the length of the electrical path between the adjacent sheets through sheet 84 is increased, since it must creep back and forth around the holes 85.

*Operation*

An electrostatic air filter as shown schematically in Figure 1 might be for use in a furnace or ventilating system or in a portable cabinet adaptable for use in a room. By means of frame 12 a disposable cell of the type shown in Figure 2 is easily inserted into the cabinet 10 and when inserted the associated electrical connections would be made to the conductors 70 and 72 of the cell to energize the conductive plates. As air is forced through the cell by fan 11 it first would pass through the ionization section formed by the upper portion of plates 13 and 14 and wire 20. The particles of foreign material in the air would then receive a charge and as they passed into the collection section they would be deposited on the conductive plates of the opposite charge depending upon which charge the particles obtained in the ionization section. Once the filter reaches its dirt holding capacity and the sheets become coated with dirt an appropriate signal device could be operated. Such a signal device might be controlled by the pressure drop across mechanical filter 74 as it becoms dirty or by excessive electrical consumption due to breakdown in the filter by dirty insulation means. Cell 15 would be removed and replaced with a clean cell.

In permanent type installations of electrostatic air cleaners the collecting cell is generally washed periodically by means of water. Thus it is obvious that a permanent type installation becomes quite expensive in that not only is the cost of the filter and associated equipment necessary but installation costs are greatly increased by the additional plumbing in the water supply and sewer connection. A disposable cell of the type the applicant has in mind would greatly decrease the cost of a filter when installed as a permanent part of a home heating plant as first it would alleviate the necessity of the water and sewer plumbing connections.

Of course, disposable cell electrostatic air cleaners have a market more in portable units for use in homes and apartments. While there are portable units on the market using metal plates, such units pose a number of problems when it comes to cleaning as generally facilities are not available for cleaning the collecting section in an easy manner. The collecting cell might be removable but great care must be used in handling the cell when out of the unit as the diret on the plates is very fine and drops from the plates very easily, this obviously could become quite messy in the average home. The applicant's cell is contained in a bag form and when removed it is destroyed and replaced with a clean cell.

A disposable cell for use in permanent type installations and portable installations of the type shown in Figure 2 has a number of advantages. Being made of thin sheets of material which are connected at various common portions it is obvious that the method of making such a cell would be rather inexpensive. In the past disposable cells have been proposed using sheets of cardboard and cardboard cannot be made up in roll form which latter lends itself to inexpensive handling. To assemble sheets of cardboard one type of machine would use air suction cups for shuffling the sheets and such a method obviously increases the cost of handling the material greatly. Thin sheets of material such as shown in the cell of Figure 2 might be stored in large rolls and the material fed off of the rolls into a machine for automatically assembling the sheets and connecting them in the manner proposed.

By using thin sheets of material not only is the handling of the material and methods of assembly simplified, but a cell which is very light and easily collapsed is made up. This is quite important as in the normal market distribution of cells of this type it is an advantage to have a cell collapsed and packaged in a lightweight package, thus further reducing the overall cost to the consumer.

As the voltage gradient between conducting plates of sheets in an electrostatic air cleaner collecting cell greatly determines the efficiency of the cell the method of holding the plates apart for insulation purposes is quite important. In the cell shown in Figure 2 the insulating sheets contact the conducting sheets at angles and length of the insulating sheet between adjacent conducting sheets exceeds the right angle distance therebetween. This in fact increases the "creep" distance along the insulator between oppositely charged plates or sheets. It is thus possible to maintain a voltage difference between the adjacent conducting plates higher than would be the case in a conventional support at right angles to the conducting plates.

To further increase the insulating ability of the insulating sheets the spaced holes as shown in Figure 4 might be placed in the insulating sheets. These holes increase the total electrical resistance of the insulating sheet between the adjacent conducting sheets. It is obvious that the more holes the insulating sheet has, the greater the insulating resistance becomes and of course the strength of the material decreases as the number of holes increases thus some optimum number of holes must be selected.

It is obvious that the method of assembly for the cell as shown in Figure 4 would also be relatively simple in that insulating material, in which the amount of material was reduced by cutting part of it away, could be obtained in roll form and the material fed from the roll into a machine for assembling the cell automatically.

It is obvious that there are other modifications of the applicant's invention which might be apparent to one skilled in the art therefore it is intended that the scope of the invention be only limited by the appended claims.

I claim:

1. In an electrostatic air cleaning apparatus, a source of power, an ionization means and a collecting means, means for causing air to flow through said ionization means and then said collecting means, said ionization and collecting means comprising two rigid grounded plates each having a lower portion and an upper portion, a wire connected to a positive terminal of said source of power, means for supporting said wire between said upper portions so that particles of material contained in air passing between said upper portions and said wire are charged, a plurality of thin sheets of conductive material, a plurality of thin sheets of insulating material, said conductive and insulating sheets being placed adjacent each other intermediate siad lower portions of said rigid plates so that starting at either of said rigid plates there exists alternatively one of said conductive sheets and one of said insulating sheets, means for attaching adjacent sheets so that the conductive sheet on one side of an adjacent insulating sheet is connected at spaced intervals running parallel to the air flow and the conductive sheet on the other side of said last mentioned insulating sheet is connected at spaced intervals running parallel to said air flow and between the connections of said insulating sheet to said previously named conductive sheet whereby when said rigid plates are separated from a collapsed cell position said insulating and conductive sheets form a cell of a honeycomb type, means connecting a positive output of said source of power to alternate ones of said conducting sheets, means for grounding the intermediate ones of said conducting sheets so that alternate conductive sheets are oppositely charged and charged particles passing through the honeycomb cell are attracted to a conductive sheet of the opposite charge.

2. In an electrostatic cleaner for removing particles of material from a fluid, a source of power, an ionization section, and a collapsible collecting section, means for causing fluid to flow through said ionization section and said collecting section, said ionization section charging the particles in said fluid as they pass therethrough, said collecting section collecting the charged particles, said collecting section comprising, a plurality of thin sheets, a first set of said sheets being connected to said source of power to be charged positively, a second set of sheets each of which is spaced intermediate said positive charged sheets, a third set of insulating sheets each of which is intermediate adjacent sheets of the assembly of said first set and of said second set so as to insulate said sheets of said first set from said second set, and means for connecting said insulating sheets to the adjacent sheets of said first and second sets at predetermined areas so that when the outer of said sheets are held apart in an non-collapsed position said collecting section has a honeycomb shape and said fluid passes down through said chambers between sheets.

3. A disposable and collapsible cell for an electrostatic gas cleaner comprising, a first set of electric conductive sheets of material, a second set of electric conductive sheets of material, said first and second sets being assembled so that alternate sheets are of the other set, a set of insulating sheets of material, said insulating sheets being assembled between every other sheet of the assembly of said first and second sets of sheets so that adjacent conductive sheets are separated by an insulating sheet, means for connecting every other insulating sheet to said adjacent conducting sheet of said first set along sections thereof parallel to one side of said sheets at predetermined intervals perpendicular to said side, means connecting the remainder of said insulating sheets to said adjacent conducting sets of said first set along sections thereof parallel to said side mid-way between the connections of said first set of sheets to said every other insulating sheets, means connecting said remaining of said insulating sheets to adjacent sheets of said second set of said conducting sheets along sections thereof parallel to said side and equal distance therefrom as said connection of said every other insulating sheets to said first set of sheets, means connecting said every other insulating sheet to adjacent sheets of said second set along sections thereof parallel to said side and equal distance therefrom as said connection of said remaining of said insulating sheet to said first set of sheets thereby upon the expansion of said assembled sheets by applying a pulling force to said outermost sheets, the sheets form an egg crate like unit having cells which run parallel to each side, each of said cells being bounded by an insulating sheet and a conducting sheet, means for electrically connecting all of said sheets of said first set, and means for electrically connecting all of said sheets of said second set.

4. A disposable cell which can be collapsed for easy packing for an electrostatic gas cleaner comprising, a first set of electric conducting sheets, a second set of electric conducting sheets, each of said sheets of said first set being interposed between adjacent sheets of said second set so that every other conducting sheet is of the same set, a plurality of electric insulating sheets each being interposed between adjacent conducting sheets, thus starting from one side there is a sheet of said first set, an insulating sheet, a sheet of said second set, an insulating sheet and so on, throughout the cell, means for connecting adjacent sheets along common portions running in one direction, said common portions for said first set of sheets and said insulating sheets on opposite sides thereof being spaced a predetermined distance along said first sheet of said first set in a second direction at right angles to said one direction, every other of said common portions of said first sheets being connected to the insulating sheet on the opposite side of said first sheet, said common portions for said second set of sheets and said insulating sheets on opposite sides thereof being spaced a predetermined distance along said sheet of said second set in said second direction, every other of said common portions of said second set being connected to the insulating sheet on the opposite side of said second sheet, thus said insulating sheets are alternatively connected to a conducting sheet of said first set and then a conducting sheet of said second set, the three sets of sheets upon being expanded from a collapsed position form a honeycomb like cell adapted to receive air therethrough in said one direction, means adapted to connect said first set of sheets to a source of power, and means adapted to connect said second set of sheets to a source of power.

5. A disposable collecting cell for an electrostatic gas cleaner comprising, a first series of conducting sheets, a second series of conducting sheets, said first and second series of sheets being assembled so that every other sheet is of the same series, a plurality of insulating sheets, one of said insulating sheets being interposed between adjacent conducting sheets, means connecting portions of each of said insulating sheets to its adjacent conducting sheets, said portions extending in one direction along said sheets and being spaced in a second direction perpendicular to said one direction, said insulating sheets being alternatively connected to adjacent conducting sheets and when said cell is expanded by a force applied to the outer sheets each of said conducting sheets zig-zag between adjacent insulating sheets to form chambers for air flow in said one direction, means for electrically connecting all of said first series of sheets together, and means for electrically connecting all of said second series of sheets together.

6. An electrostatic air cleaning apparatus comprising an ionization section for charging particles contained in the air, a collector section for collecting the particles, a power source for supplying power to said ionization section and said collector section, and means for forcing air through said sections in the order mentioned, said ionization section and said collector section comprising, two outer rigid grounded plates extending throughout said collector section and into said ionization section, said ionization section containing a charged wire supported between said plates perpendicular to the air flow, a plurality of thin sheets of conductive material laid between said outer plates and extending throughout said collector section, a plurality of thin insulating sheets each of which is laid between adjacent of said conductive sheets, and means for attaching adjacent sheets by fastening said adjacent sheets so that adjacent conductive sheets are separated by a portion of said inbetween insulating sheet thereby forming passageways for air to flow parallel to said sheets along one dimension thereof, said insulating sheets having portions removed therefrom to increase the electrical resistance between adjacent conductive sheets.

7. A disposable collecting cell for an electrostatic gas cleaner comprising, a first set of conducting sheets, a second set of conducting sheets, a plurality of insulating sheets, means connecting said conducting sheets and said insulating sheets in an assembly so that every other conducting sheet is of the same set and adjacent conducting sheets are separated by an insulating sheet, and means connecting each of said insulating sheets to adjacent conducting sheets so that when said assembly is expanded, isolated air passages are formed by portions of each of said insulating sheets and the adjacent conducting sheets, said insulating sheets having portions removed therefrom for increasing the electrical resistance thereof and thus the insulation between a conductive sheet of said first set and an adjacent conductive sheet of said second set.

8. A disposable collecting cell for an electrostatic gas cleaner comprising, a first series of conducting sheets, a second series of conducting sheets, said first and second series of sheets being assembled so that every other sheet is of the same series, a plurality of insulating sheets, each of said insulating sheets being interposed between different adjacent conducting sheets, means connecting portions of each of said insulating sheets to its adjacent conducting sheets, said portions extending in one direction along said sheets and being spaced in a second direction perpendicular to said one direction, said insulating sheets being alternatively connected to adjacent conducting sheets and when said cell is expanded by a force applied to the outer sheets each of said insulating sheets zig-zags between adjacent conducting sheets to form passages for air flow in said one direction, means for electrically connecting all of said first series of sheets together, and means for electrically connecting all of said second series of sheets together, said insulating sheets having holes therein which are spaced to increase the electrical creep distance between adjacent conductive sheets.

9. A disposable collecting cell for an electrostatic gas cleaner comprising, a first series of conducting sheets, a second series of conducting sheets, said first and second series of sheets being assembled so that every other sheet is of the same series, a plurality of insulating sheets, each of said insulating sheets being interposed between adjacent conducting sheets, means connecting portions of each of said insulating sheets to its adjacent conducting sheets, said portions extending in one direction along said sheets and being spaced in a second direction perpendicular to said one direction said insulating sheets being alternatively connected to adjacent conducting sheets and when said cell is expanded by a force applied to the outer sheets each of said insulating sheets zig-zags between adjacent conducting sheets to form passages for air flow in said one direction, means for electrically connecting all of said first series of sheets together, and means for electrically connecting all of said second series of sheets together, said insulating sheets having holes therein which are spaced to increase the electrical creep distance between adjacent conductive sheets, said holes being elongated with the greater dimension in said one direction, the center of adjacent holes being staggered so a continuous length of material of an insulating sheet only exists between adjacent conductive sheets by zig-zagging around said holes.

References Cited in the file of this patent

UNITED STATES PATENTS

| | | |
|---|---|---|
| 2,443,780 | Wintermute | June 22, 1948 |
| 2,639,781 | Savitz | May 26, 1953 |
| 2,650,672 | Barr et al. | Sept. 1, 1953 |